United States Patent [19]
Rozmus

[11] Patent Number: 5,729,662
[45] Date of Patent: Mar. 17, 1998

[54] NEURAL NETWORK FOR CLASSIFICATION OF PATTERNS WITH IMPROVED METHOD AND APPARATUS FOR ORDERING VECTORS

[76] Inventor: J. Michael Rozmus, 4 Laura La., Marlton, N.J. 08053

[21] Appl. No.: 487,062

[22] Filed: Jun. 7, 1995

[51] Int. Cl.⁶ ................................................. G06F 15/18
[52] U.S. Cl. ........................ 395/23; 395/22; 395/24
[58] Field of Search ........................ 395/22, 23, 24; 382/159, 160

[56] References Cited

U.S. PATENT DOCUMENTS

| | | | |
|---|---|---|---|
| 5,371,809 | 12/1994 | Desieno | 382/15 |
| 5,479,575 | 12/1995 | Yoda | 395/23 |

OTHER PUBLICATIONS

T. Kohonen, "The Self Organizing Map," Proc. of the IEEE, vol. 78, No. 9, Sep. 1990, pp. 1464–1480.
B. Fritzke, "Growing Cell Structures–A Self Organizing Network for Unsupervised Learning", Neural Networks, vol. 7, No. 9, pp. 1441–1460, 23 Mar. 1994.
H Bauer and K. Pawelzik, "Quantifying the Neighborhood Preservation of Self Organizing Maps", IEEE Transactions on Neural Nertworks, vol. 3, No. 4, Jul. 1992.
S. Haykin, "Neural Networks, A Comprehensive Foundation", IEEE Press and Macmillan College Publishing Company, New York, NY, 1994, pp. 408–422, 439, 442.
H. Yin, et al., "Inverse–Step Competitive Learning," IEEE Int'l. Joint Conf. on Neural Networks, pp. 839–844., Nov. 1991.
C. Hsu and H. Wu, "An Improved Algorithm for Kohonen's Self–organizing Feature Maps," 1992 IEEE Int'l. Symposium on Circuits and Systems, pp. 328–331., May 1992.
R. Sadananda, et al., "The Choice of Neighourhood in Self–Organizing Scheme for VLSI," Proc. Second Int'l. Conf. on Expert Systems for Development; pp. 261–266., Mar. 1994.
D. Choi and S. Park, "Self–Creating and Organizing Neural Networks," IEEE Trans. on Neural Networks, vol. 5(4), pp. 561–575., Jul. 1994.
L. Andrew, "Neuron Splitting for Efficient Feature Map," Proc. 1994 Second Australian and New Zealand Conf. on Intelligent Information Systems, pp. 10–13., Nov. 1994.

*Primary Examiner*—Robert W. Downs
*Attorney, Agent, or Firm*—Allan Jacobson

[57] ABSTRACT

A type of neural network called a self-organizing map (SOM) is useful in pattern classification. The ability of the SOM to map the density of the input distribution is improved with two techniques. In the first technique, the SOM is improved by monitoring the frequency for which each node is the winning node, and splitting frequently winning nodes into two nodes, while eliminating infrequently winning nodes. Topological order is preserved by inserting a link between the preceding and following nodes so that such preceding and following nodes are now adjacent in the output index space. In the second technique, the SOM is trained by applying a weight correction to each node based on the frequencies of that node and its neighbors. If any of the adjacent nodes have a frequency greater than the frequency of the present node, then the weight vector of the present node is adjusted towards the highest-frequency neighboring node. The topological order of the nodes is preserved because the weight vector is moved along a line of connection from the present node to the highest-frequency adjacent node. This second technique is suitable for mapping to an index space of any dimension, while the first technique is practical only for a one-dimensional output space.

26 Claims, 10 Drawing Sheets

$(F_{14} > F_{13})$ AND
$(F_{14} > F_{12})$

NEURAL NETWORK FOR CLASSIFICATION OF PATTERNS WITH IMPROVED METHOD AND APPARATUS FOR ORDERING VECTORS

FIELD OF THE INVENTION

This invention relates to the field of neural networks useful in pattern recognition and artificial intelligence systems.

BACKGROUND OF THE INVENTION

Neural networks are processes useful for classifying and recognizing patterns. A widely known type of neural network, which is described as a viable alternative to the more traditional neural network architecture, is the self organizing map (SOM) neural network method described by Teuvo Kohonen, in "The Self-Organizing Map," Proceedings of the IEEE, Volume 78, Number 9, September 1990, pp. 1464–1480 and in *Self-Organizing Maps*, Springer-Verlag, New York, N.Y., 1995.

The SOM is characterized by the following properties:

UNSUPERVISED LEARNING—The SOM process learns the distribution of a set of input patterns without any information about the segregation of the samples into different classes.

TOPOLOGICAL ORDERING (NEIGHBORHOOD PRESERVATION)—All pattern classification techniques aim to determine the most likely class from which a test sample is drawn. But the SOM process also provides information about the classes that rank second, third, fourth, etc. in their likelihood of including the test sample. In other words, the relative closeness of patterns in the input space is well-preserved in the output space.

DIMENSIONAL REDUCTION—The SOM process can change the comparison of high-dimensional vectors in the input space to comparison of vectors of much smaller dimension typically one or two) in the output space.

The property of unsupervised learning makes the SOM process useful for data analysis, data visualization, and/or clustering analysis. The properties of topological preservation, and dimension reduction make the SOM process especially powerful in the classification of entities which include a very large number of classes. Sometimes there are so many classes that the transitions from one class to the next is practically continuous with no real separation from one class to the next.

The operation of a SOM consists of two distinct phases: learning and recall. First, in the learning phase, a large number of patterns are input to the neural network as a training set. The SOM learns the distribution of the training set and maps the input training patterns to an index space.

After training, an unknown pattern is input to the neural network which places the unknown pattern in the index space by generating a point representing a position in the index space. The pattern from the training set that is identified by a point in the index space closest to the point corresponding to the unknown pattern is deemed to be the closest pattern match. Furthermore, other training patterns that are identified by points in the index space in the vicinity of the point corresponding to the unknown pattern, are deemed to be the next closest pattern matches. If more than one equidistant patterns are found, other independent criteria, such as context with prior pattern matches, may be used to select the best pattern match.

Input patterns are represented by vectors. That is, a pattern which has a number of variables or components, D, is represented in D-dimensional space by a multi-dimensional vector having D-dimensions. For example, an image composed of 256 pixels may be represented by a 256 dimensional vector. D-dimensional vectors can be conceptually visualized as points in D-dimensional space.

The treatment of D-dimensional space is similar to that of the commonly experienced 1 dimensional space (a line), 2 dimensional space (a plane) or 3 dimensional space (the universe). Beyond 3 dimensions, physical analogies do not exist, but with respect to concepts such as a distance measure between two points, for example, the lack of a physical analogy makes no difference.

As indicated, the purpose of a SOM method is to map input vectors of the D-dimensional space (representing features of some objects to be indexed or classified) into a lower-dimensional space (in the simplest case, 1 dimension). To map the input vectors from the D-dimensional space to a 1 dimensional space (the index), a number of points in the D-dimensional space, associated with neurons, or simple processing nodes, are selected and distributed throughout the D-dimensional space. A measure along the line connecting the neurons in a given order is the one dimensional index, and each vector in the D-dimensional space is projected onto the index by a similarity function. Thus, the D-dimensional input vectors are topologically ordered along the one dimensional index according to their degree of similarity to the closest neurons.

The key to the effectiveness of recognizing patterns with a one-dimensional SOM is the ability to select the proper number of neurons, and place those neurons at the proper points in the D-dimensional space. The goal is to choose enough neurons to adequately divide the input patterns into sufficient categories, and also to place the neurons in the D-dimensional space such that there is a uniform distribution of input vectors around each neuron and along the 1 dimensional index connecting the neurons (to achieve adequate resolution).

Selecting and distributing the neurons throughout the D-dimensional space is performed during the learning phase. Kohonen arbitrarily selected a number of neurons thought to be sufficient for the pattern recognition problem at hand, and placed them arbitrarily in the D-dimensional space. Thereafter, an input sample vector is then selected at random from the training set and placed in the D-dimensional space. The neuron closest to the input sample is identified (the winning node) and moved toward the input sample. Some or all of the other neurons are also moved toward the input sample but by a lesser amount depending upon the relative proximity of each of such other nodes to the winning node. Then another input sample is selected from the training set and the process is repeated. Each time, the winning node in the learning competition (closest neuron) is moved the most. Eventually, the nodes are distributed throughout the D-dimensional space, creating (in the simplest case) a 1-dimensional index for comparing unknown patterns to the patterns in the training set.

Kohonen's original learning algorithm is computationally intensive. One reason for the computational burden is the many adjustments required in the early stages of learning (because many nodes are moved together in a correlated manner). Beginning in 1989, Luttrell developed a significant improvement to the speed of SOM learning (Haykin, S., Neural Networks: A Comprehensive Foundation, IEEE Press and Macmillan College Publishing Company, New York, N.Y., 1994, pp. 410 and 442). The essence of Luttrell's technique is to gradually grow the size (number of nodes) of the network in successive stages of training, by doubling the number of nodes at the end of each stage. The weights (vector position in D-dimensional space, also referred to herein as the weight vector) of new nodes are initially set by interpolation between the weights of adjacent old nodes. After each doubling, the network is retrained, i.e., the input vectors are reapplied to the neural network after each growth phase. Node doubling continues until the size of the network is sufficient to obtain the desired resolution (network size). Luttrell's method provides a substantial improvement in the speed of learning.

In an ideal SOM, each node would represent an equal number of input samples from the training set, and the distance between the weight vectors of adjacent nodes would be inversely proportional to the local density in the input space. Kohonen originally believed that his original learning algorithm would asymptotically approach this ideal. But subsequent research shows that this is not quite correct. In general, feature maps (SOM's) computed by Kohonen's original algorithm (and with Luttrell's speed improvement) tend to use too many nodes to represent less dense regions of the input space, and not enough nodes to represent the more dense regions. It is desirable that the distribution of the mapped vectors in the output space be as close as possible to a uniform distribution, thus optimizing the resolution of differences among the mapped vectors, and optimally using available computer memory and processor resources.

In 1988, DeSieno proposed and tested a heuristic correction to Kohonen learning that he called a conscience mechanism (see DeSieno, D., "Adding a Conscience to Competitive Learning", IEEE international Conference on Neural Networks, Jul. 24–27, 1988, San Diego, Calif., pp. 1–117 to 1–124 and HAYKIN, supra, 1994, pp. 435–439). DeSieno used a frequency measure in which each neuron keeps track of how many times it is closest to the input sample, which would normally make it the winner of the learning competition. The frequency measure of each neuron is used to determine whether or not its weight vector will be adjusted. If the neuron is the closest too often (i.e. representing too many of the input samples) then it arbitrarily reduces its likelihood of winning the competition by an amount proportional to its frequency of previous wins. Thus, neurons that win the learning competition less frequently are drawn into the more dense regions of the input space. DeSieno's correction is very successful for some input distributions but has severe problems with others. In particular, DeSieno's correction does not work well when the difference between the highest and lowest density values in the input distribution is too great.

Another approach for achieving a more uniform distribution of the mapped vectors in the output space is shown by Fritzke in "Growing Cell Structure—A Self-Organizing Network for Unsupervised and Supervised Learning" (Neural Networks, Vol. 7, No. 9, pp. 1441–1460). As in DeSieno, the performance of each node is monitored by estimating the proportion of samples that are closest to each node to form a frequency measure for each node. The frequency measure is then used to insert additional nodes where the frequency measure of a node is high and delete nodes when the frequency measure of a node is low. If a node is eliminated, its links to adjacent nodes are removed. Thus, this prior art approach leads to multiple disconnected structures because when eliminating nodes, the links to adjacent nodes are removed.

Furthermore, when adding nodes, the Fritzke's prior art shows doing so by insertion, i.e., a new node is inserted between the winning node and the most distant node connected to the winning node, without changing the position of the winning node.

SUMMARY OF THE INVENTION

The neural network of the present invention overcomes limitations of prior art for self organizing maps with an improved method and apparatus for ordering vectors representing input patterns. The embodiment described in detail below applies to a SOM that maps the vectors to a one-dimensional index (but it is significant that some part of the techniques of this embodiment apply also to SOM's that map to higher-dimensional spaces). During the learning phase, input samples are compared to the positions of the nodes of the network, adjustments are made to alter the positions and/or number of nodes of the neural network to better match the input samples, and this process is repeated until the network adequately represents the input sample distribution with a sufficient number of nodes.

In a first aspect of the present invention, the neural network is taught by SOM learning (with node-doubling speed-up technique) while monitoring the frequency that each node is the winning node, and splitting frequently winning nodes into two nodes, while eliminating infrequently winning nodes. If the frequency measure of a winning node exceeds a high threshold (represents too many samples), the winning neuron is split into two new neurons and the weights of the two new nodes are interpolated between the preceding and following nodes. If the frequency measure falls below a low threshold, the neuron is deleted. However, the topological order of the one dimensional index is preserved by inserting a link between the preceding and following nodes so that such preceding and following nodes are now adjacent along the modified one dimensional index.

These comparatively large adjustments are somewhat analogous to biological death and reproduction of cells. Neurons that represent too many samples reproduce by fission and distribute the load among the two new neurons connected by a synaptic link. Neurons that represent too few samples die off because of poor performance or lack of use. Thus a neural net using this first adjustment alone may be descriptively termed a living self organizing map, or LSOM.

In a second aspect of the present invention, there is a finer adjustment to the frequency distribution. The weights of all nodes are periodically adjusted by applying a weight correction based on the frequency of neighboring nodes. This weight correction is computed by comparing the frequency of each node to the frequencies of its adjacent nodes. If any of the adjacent nodes have a frequency greater than the frequency of the present node, then the weight vector of the present node is adjusted towards the higher frequency node by an amount that is a monotonically-increasing function of the magnitude of the difference between frequencies of the present node and its adjacent node.

Thus, a node which represents relatively few input samples in its local region of the SOM, will be moved to "assist" the adjacent node that represents a comparatively larger number of input samples. The topological order of the nodes is preserved because the weight vector of each node is adjusted along the line of connection from the present node to the higher-frequency adjacent node. This adjustment compensates for the tendency of the basic SOM algorithm to use too many nodes in the sparse regions of the input distribution and too few nodes in the dense regions of the input distribution. Thus a neural net using this adjustment may be descriptively termed a density-tracking self organizing map, or DSOM.

DETAILED DESCRIPTION

As indicated above, the purpose of a SOM method is to map vectors of arbitrary dimension, representing features of some objects to be indexed or classified, into an equal or lower dimensional space. After mapping, the weight vectors of the neurons of the resulting one-dimensional array of neurons accurately represents the distribution of the input samples of higher-dimensional vectors in the input space (the training set), while maintaining as closely as possible the topological ordering of the input vectors after they are mapped into the output space.

For the learning phase, the network learns the input vector distribution from the samples of the training set. In the recall phase, the network generates an index coordinate in the one-dimensional output space for any input vector, whether or not it is a member of the training set.

Figure 1:
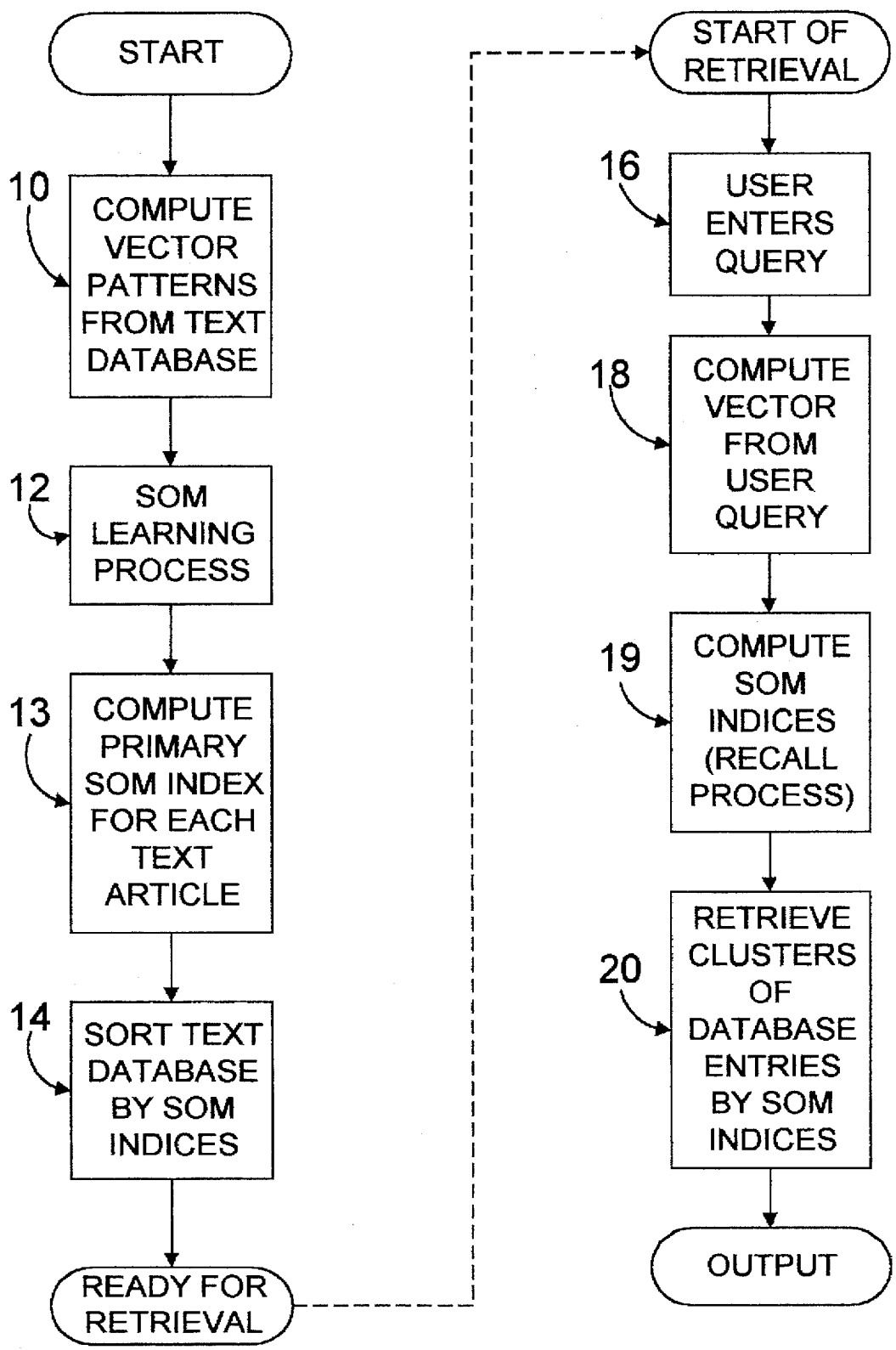
FIG. 1 is a flowchart diagram of a method using a neural network for the classification of patterns of a textual database in conjunction with the present invention.

An overview of the process is shown in FIG. 1. The left column shows the learning phase. Vector patterns of the statistics of word occurrences are computed 10 from a textual database. The length-normalized vectors are used to teach the SOM 12 in the central learning process. When SOM learning is complete, the SOM generates a primary index for each text articles in the database 13. These indices are used to sort 14 the entire database. The sorted database embodies an ordering of the input vectors along a one-dimensional index. The neural network is now ready for use.

The right column of FIG. 1 shows the recall, or retrieval, phase. A user query 16 is converted into a vector by extracting the D-dimensional vector 18 of the statistics of word occurrences in the query, and computing 19 one to several points on the SOM index that are most similar to the input vector. These index points are used to retrieve clusters 20 of articles relevant to the words of the user's query. Each cluster contains the text articles having a primary index (i.e. index point that is most similar to that article) in the vicinity of one of the computed indices 19. These clusters of entries 20 represent the groups of related articles most similar to the user query 16.

Figure 2:
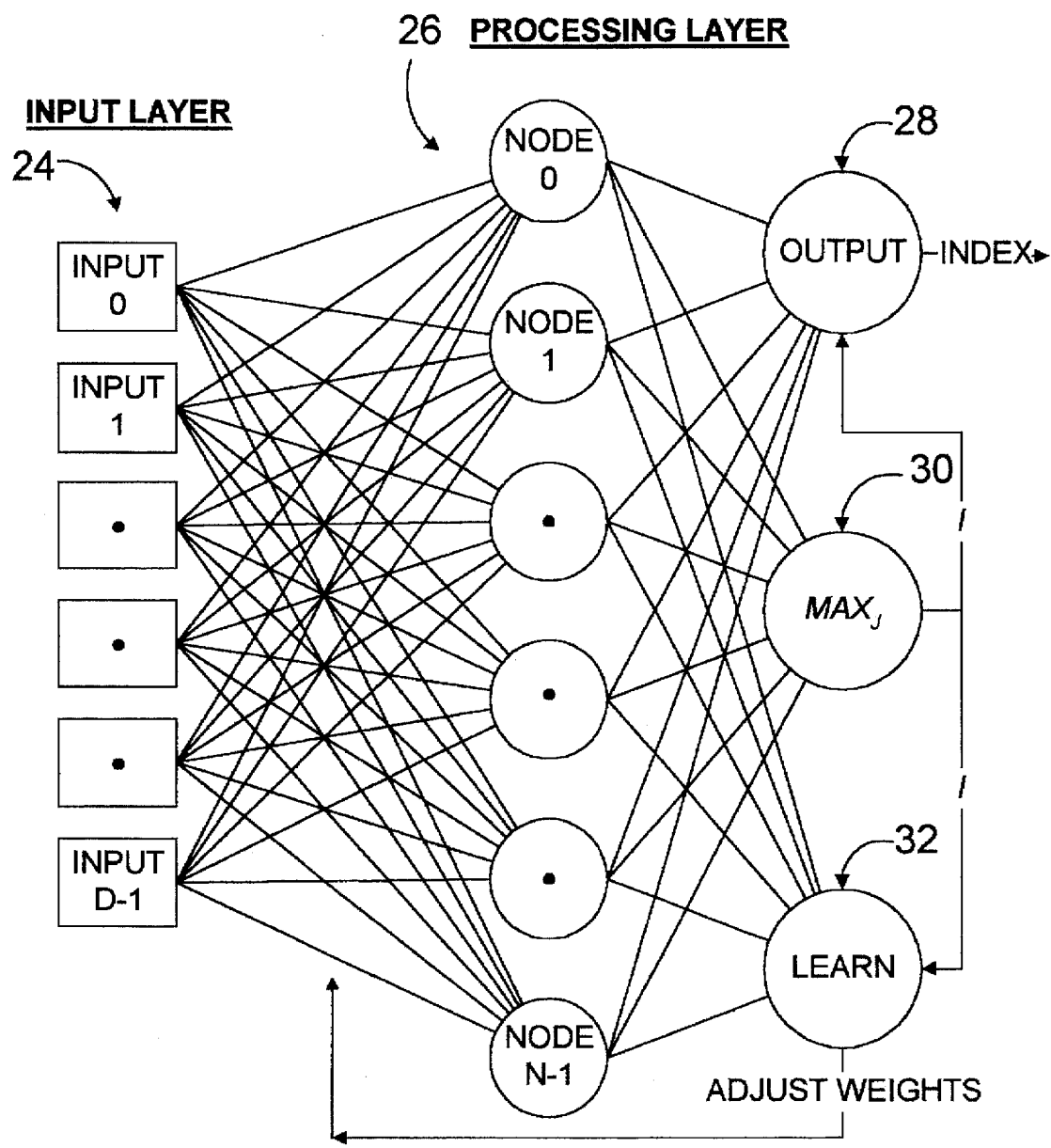
FIG. 2 shows a configuration of interconnected processors implementing a self organizing map for use in conjunction with the present invention.

FIG. 2 shows a configuration of interconnected processors that can implement the present invention. The input layer 24 contains the components of a D-dimensional input vector. Each component is broadcast to all nodes of the processing layer 26. Each of the N nodes of the processing layer 26 broadcasts its output to all three of the specialized processing nodes: OUTPUT 28, $MAX_J$ 30, and LEARN 32. The LEARN 32 and $MAX_J$ 30 nodes work together to adjust the weights associated with the processing layer inputs during the learning phase. The OUTPUT 28 and $MAX_J$ nodes 30 work together to generate one to several indices for any input vector during the recall phase.

Figure 3:
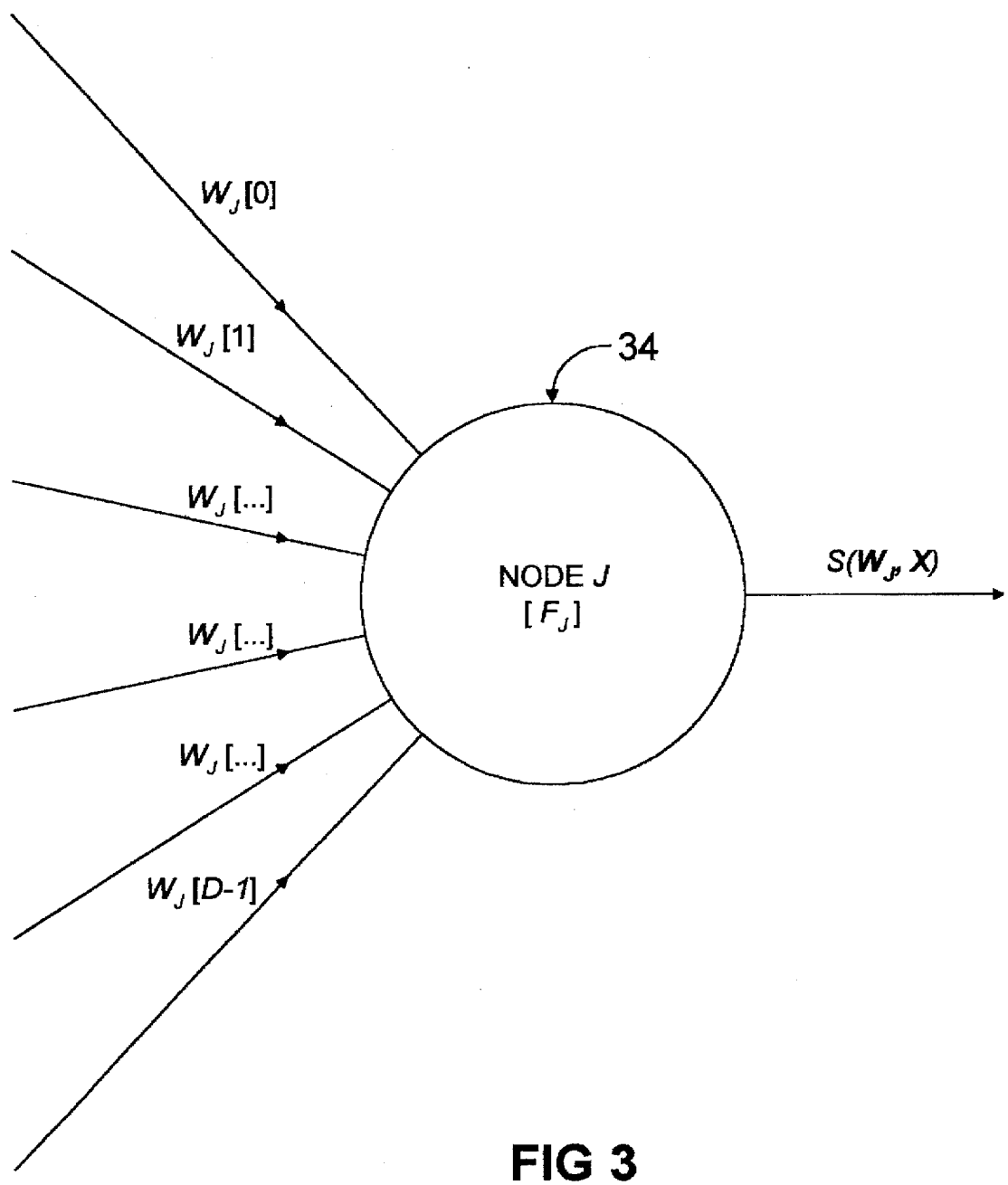
FIG. 3 is a detailed diagram of a node in the processing layer 26 of FIG. 2.

FIG. 3 is a more detailed diagram of a node in the processing layer. Each node contains a weight vector, $W_J$, with components associated with the respective components of the input vector, and a frequency measure, $F_J$. The output of the node J (reference 34) is the similarity measure $S(W_J, X)$. Any reasonable similarity measure (or its inverse distance measure), including the common Euclidean and dot product measures, can be used.

Basic SOM Learning Process

Figure 4A:
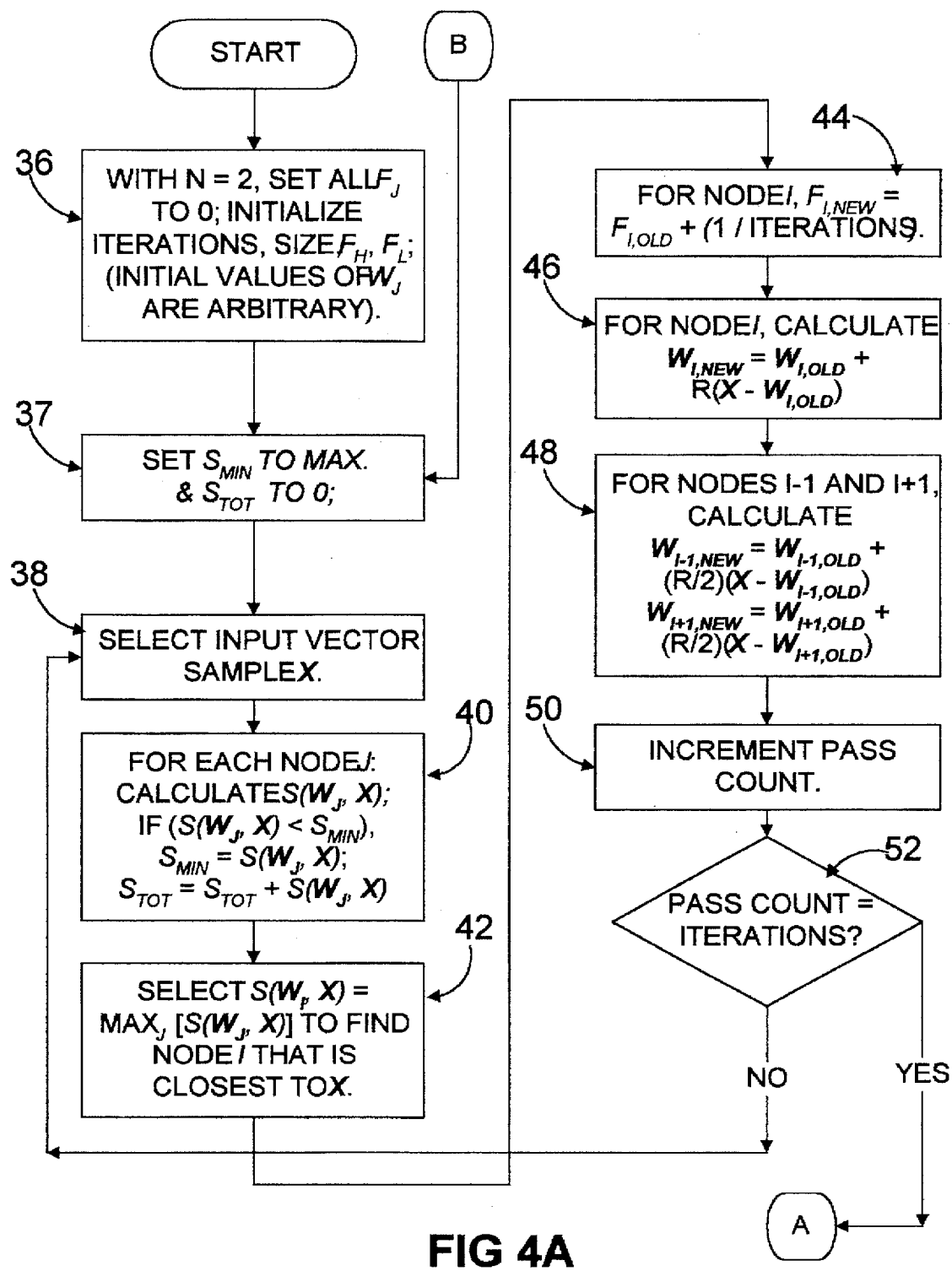
FIG. 4A is a flow chart diagram of the portion of the learning phase that implements the basic SOM learning algorithm used in conjunction with the present invention.
Figure 4B:
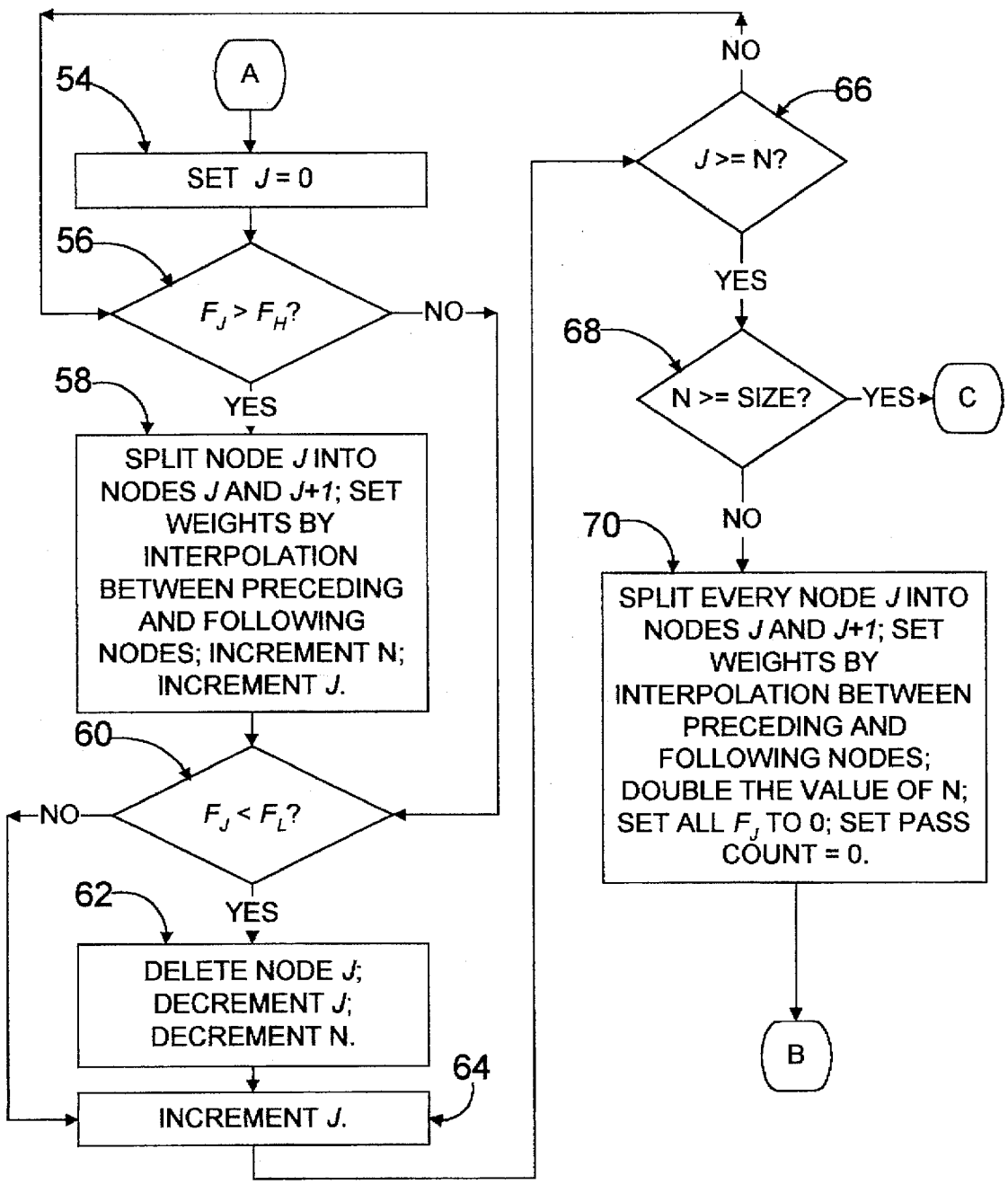
FIG. 4B is a flow chart of the portion of the learning phase that implements the LSOM adjustment that is part of the present invention.
Figure 4C:
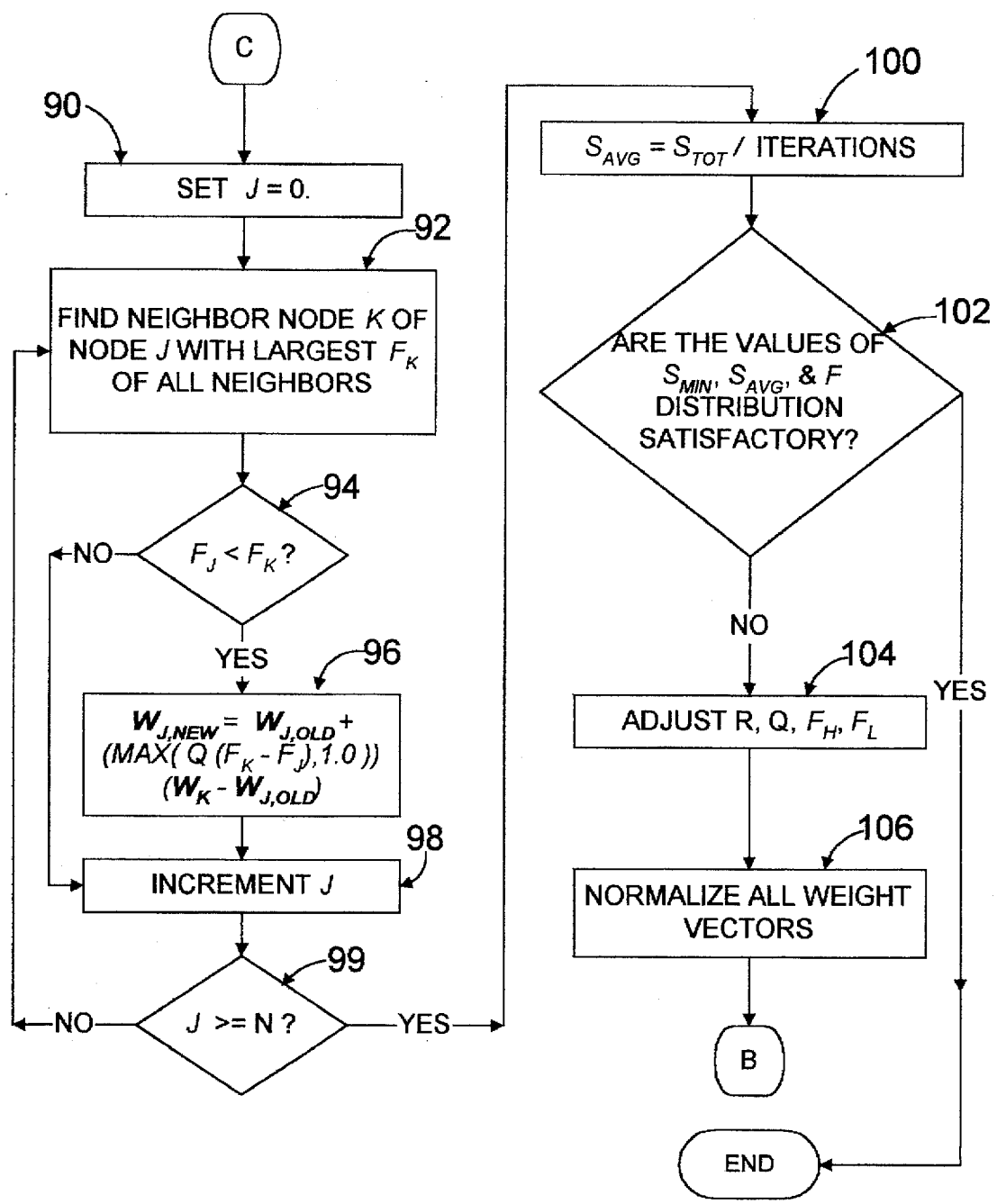
FIG. 4C is a flow chart of the portion of the learning phase that implements the DSOM adjustment that is part of the present invention.

FIGS. 4A, 4B, and 4C are a flowchart of the details of the learning process of step 12, FIG. 1.

FIG. 4A illustrates the basic SOM learning part of the process:

A. In steps 36 and 37, the network is initialized. N is the number of nodes. Iterations is the number of samples used in each pass of the basic SOM learning. Size in the desired minimum number of nodes in the completed SOM. $F_H$ and $F_L$ are the high frequency threshold and the low frequency threshold, respectively. The minimum similarity value ($S_{MIN}$) and the total sum of similarity values ($S_{TOT}$) of a given learning pass are initialized in step 37. Length-normalized initial weight vectors may be chosen arbitrarily. Frequencies are initialized to 0.

B. Select an input vector sample from the training set at step 38.

C. the winning node to be adjusted toward the input sample is found (steps 40 and 42), by determining node I such that:

$$S(W_I, X) = MAX_J[S(W_J, X)] \qquad [EQ\ 1]$$

where S is a function that gives some measure of the similarity between the two vector parameters, $W_J$ is the weight vector of node I, X is a vector sample from the input space, and $MAX_J$ is the maximum over all values of J.

$S_{MIN}$ and $S_{TOT}$ are also adjusted in step 40.

As previously indicated, the output of the node J, the similarity measure $S(W_J, X)$, may be any reasonable similarity measure. The current embodiment uses the dot-product similarity measure which is the sum of the products of the respective component values of the two vectors. Mathematically:

$$S(W_J,X) = \sum_{N=0}^{D-1} W_N X_N \qquad \text{[EQ 2]}$$

D. increment frequency estimate of the winning node by a proportional count in step 44.

E. Adjust the weights of the closest node at step 46 according to the formula for basic SOM learning:

$$W_{I,NEW} = W_{I,OLD} + R(X - W_{I,OLD}) \qquad \text{[EQ 3]}$$

where $W_{I,OLD}$ is the current weight vector of node I before adjustment, $W_{I,NEW}$ is the weight vector of node I after adjustment, X is the current sample vector, and R is the SOM learning rate. Also, at step 48, adjust the weights of the two nodes adjacent to the closest node with the same formula, except that R is reduced by a positive fractional multiplier less than one (for example, one/half, as shown in step 48).

F. Repeat steps B, C, D, and E, above, for a fixed number of iterations to adequately train the current network. A pass counter is incremented at step 50. The pass counter is tested at step 52, and if not equal to the desired iterations, the process is repeated from step 38. Otherwise, if the pass count is equal to the desired iterations at step 52, the process continues as shown in FIG. 4B.

Although the process just described above starts with arbitrary weight vectors to emphasize the power of the SOM to learn an input distribution with no prior knowledge, this is not essential. A good guess for a set of ordered initial weight vectors will speed the process of learning. For example, for N=D=3, and vector length of 1, the initial vectors weights for a ring of nodes could be:

[0,0,1], [0,0,1], [0,1,0], [0,1,0], [1,0,0], [1,0,0]

This technique worked well in the information retrieval application described in detail below.

LSOM Frequency Adjustment

FIG. 4B illustrates the LSOM frequency adjustment. Following application of the training vectors and decision step 52 in FIG. 4A:

G. A counter is initialized to zero at step 54. Each node for which the frequency is greater than a high threshold, $F_H$, (Step 56) is split into two new nodes (step 58). The weight vectors of these two new nodes are evenly spaced (at ⅓ intervals) along the line segment connecting the weight vectors of the preceding and following nodes in the network.

Alternatively, the two new nodes may be spaced proportionally by interpolation. For example, the two new nodes may be spaced in proportion to the relative frequency of the preceding and following nodes, respectively, to the frequency of the split node, so that the new nodes are proportionally placed nearer to the higher frequency nodes.

H. Each node for which the frequency is less than a low threshold, $F_L$, (step 60) is deleted from the network (step 62). The counter is incremented at step 64, and tested at step 66 to determine if all N nodes have been processed. If not, the process repeats from step 56. If all N nodes have been processed, the network size is tested at step 68. If the number of network nodes is greater than or equal to a desired value, the program proceeds to FIG. 4C. If the number of nodes is not yet sufficient to obtain the desired resolution (network size), double the number of nodes at step 70 by splitting each node in the manner of step G, above, initialize all frequencies and the pass count to 0 and go back to step B, above.

Figure 5:
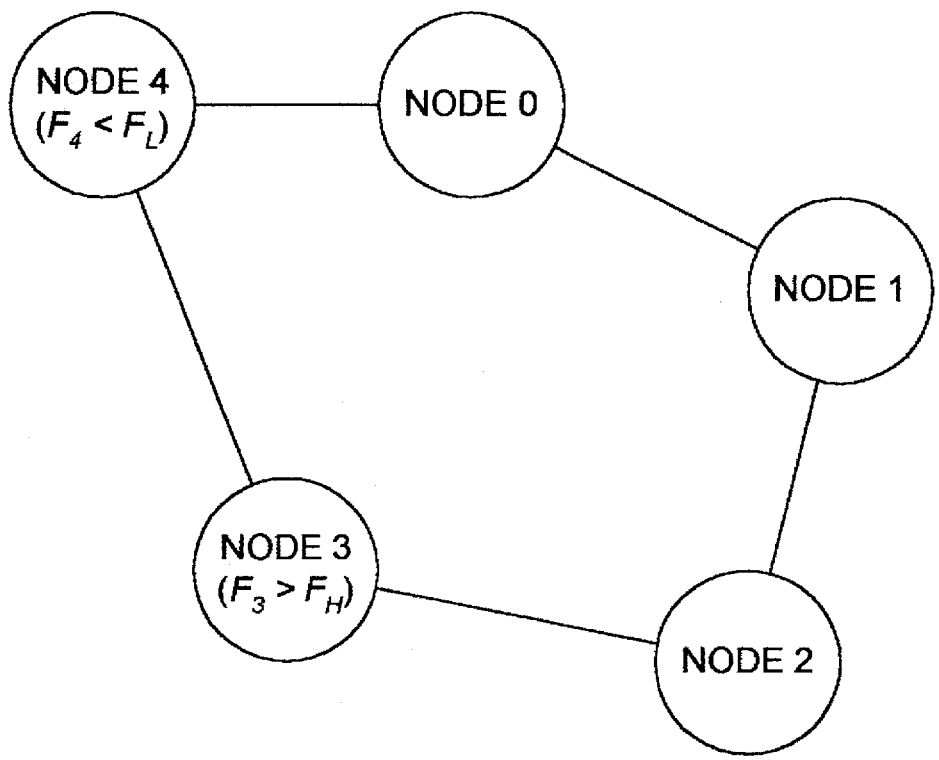
FIG. 5 shows a one-dimensional ring of nodes just before some nodes are split or eliminated responsive to frequency measurements in the LSOM learning process embodying the present invention.
Figure 6:
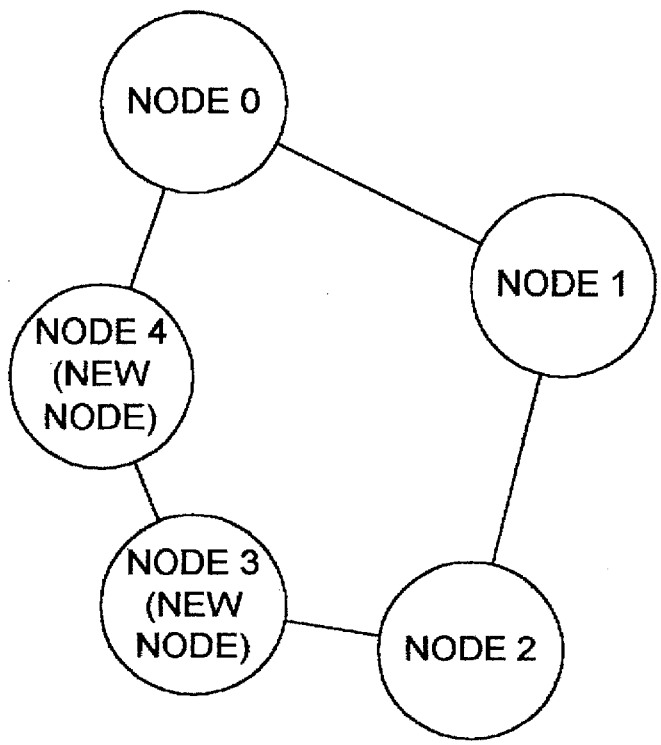
FIG. 6 shows a one-dimensional ring of nodes just after some nodes have been split or eliminated responsive to frequency measurements in the LSOM learning process embodying the present invention.

The process of growing the network by splitting frequently used nodes and deleting infrequently used nodes is illustrated in FIGS. 5 and 6. In FIG. 5, node 0, node 1, node 2, old node 3 and old node 4 form a topologically ordered ring of nodes which have been positioned by the process of FIG. 4A. FIG. 5 shows the situation in a one-dimensional ring of LSOM nodes just after step F, above. FIG. 6 shows the resulting network after the node splitting and node deleting process of FIG. 4B.

The frequency of old node 3 is $F_3 > F_H$ while the frequency of old node 4 is $F_4 < F_L$. (Thus, old node 4 has a frequency that is below the low threshold and old node 3 has a frequency above the high threshold.) All other nodes have frequencies between the high and low thresholds. First, old node 3 is split into two nodes: new node 3 and new node 4. New node 3 is placed by interpolation between old node 3 and node 2. New node 4 is placed by interpolation between old node 3 and old node 4. Then, old node 4 is deleted and new node 4 is connected to node 0. FIG. 6 shows the resulting network of node 0, node 1, node 2, new node 3 and new node 4. The original old node 4 has been deleted, and the original old node 3 has been split into the new nodes 3 and 4. The overall effect is to move nodes out of the sparse areas of the input sample distribution into the denser areas of the input sample distribution.

Figure 7:
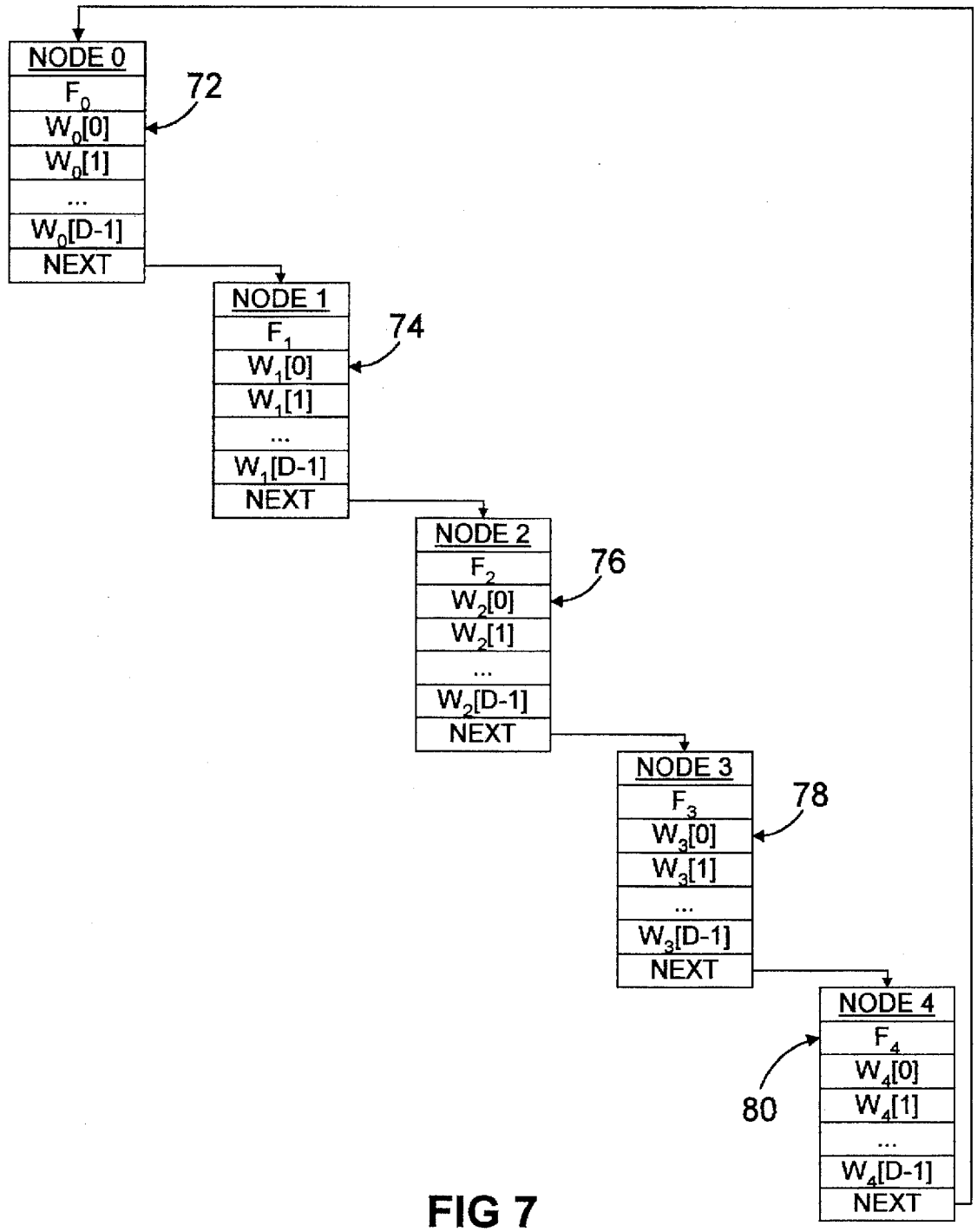
FIG. 7 shows a linked list memory architecture representing the ordered nodes of FIG. 5.
Figure 8:
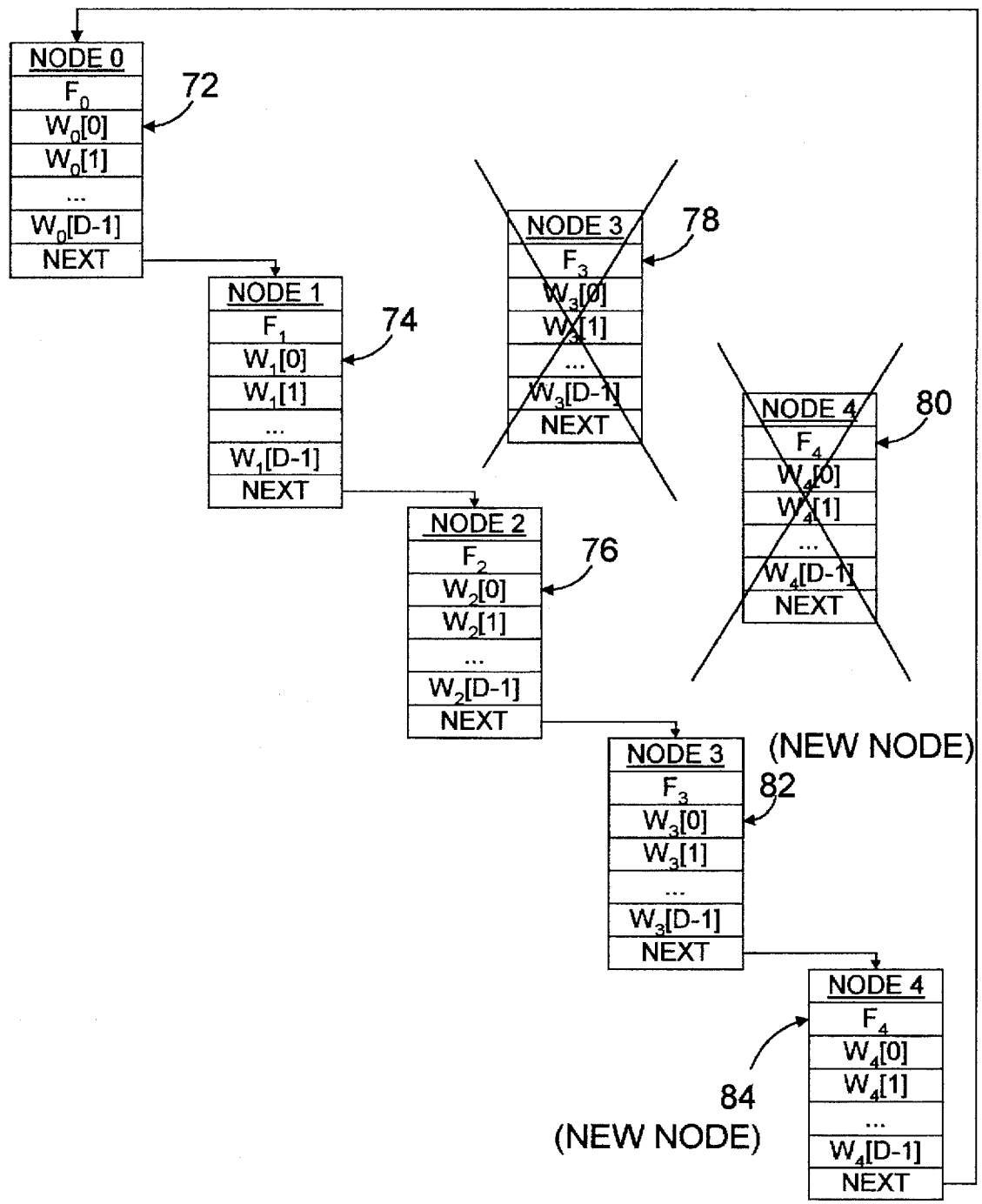
FIG. 8 shows a linked list memory architecture representing the ordered nodes of FIG. 6.

An implementation of the memory structure to accomplish the nodes and node manipulation of FIGS. 5 and 6 is shown in FIGS. 7 and 8 respectively. Specifically, in FIG. 7 a linked list memory architecture represents the ordered nodes of FIG. 5. Each entry in the linked list includes the node number. Node 0 is represented by an entry 72 in the linked list. The components of the vector weight of node 0 in D-dimensional space are $W_O[0], W_O[1], \ldots, W_O[D-1]$. Node 1, node 2, old node 3, and old node 4 are represented by entries 74, 76, 78 and 80 respectively. Node 0 is linked to node 1 by pointer in node 0. Similarly node 1 is linked to node 2 by a pointer in node 1, and so on to represent a ring in which the pointer of old node 4 points to node 0.

In FIG. 8, the ordered nodes of FIG. 6 are represented by a linked list memory architecture. New node 3 and new node 4 are created by establishing new linked list entries 82 and 84 respectively. Nodes are added, eliminated or reordered by changing the linked list pointers. In particular, old node 3 and old node 4 are eliminated by changing the pointer of node 2, linked list entry 76 to point to new node 3 (linked list entry 82), skipping linked list entries 78 and 80. Node 2 is linked to new node 3 by pointer in node 2. Similarly new node 3 is linked to new node 4 (entry 84) by a pointer, and so on to represent a ring in which the pointer of new node 4 points to node 0.

DSOM Frequency Adjustment

FIG. 4C illustrates DSOM frequency adjustment:

K. A counter is initialized to zero at step 90. The neighboring node K to each node G having the largest frequency, $F_K$, is determined at step 92.

L. The frequency of node K is compared to the frequency of the present node J at step 94. If the frequency of node K is greater than the frequency of node J, then the weight vector of node J is adjusted according to the following formula:

$$W_{J,NEW} = (\text{MAX}(Q(F_K - F_J), 1.0))(W_K - W_{J,OLD}) \qquad \text{[EQ 4]}$$

where $W_{J,OLD}$ is the current weight vector of node J before adjustment, $W_{J,NEW}$ the weight vector of node J after adjustment, $W_K$ is the weight vector of the node adjacent to J that has the largest frequency $F_K$, $F_J$ is the frequency of node J, MAX is the maximum function that chooses the largest of its two parameters, and Q is a parameter called the density correction rate.

The counter is incremented at step 98, and tested at step 99 to determine if all N nodes have been processed. If not, the process repeats from step 92. If all N nodes have been processed, The average similarity value is computed (step 100).

M. In step 102, a human expert examines the values of $S_{MIN}$, $S_{TOT}$, and the F distribution (i.e. the number of nodes having each of the possible frequency values). If these measures of quality are judged to be satisfactory, then the learning process terminates. If these measures are not satisfactory, then the expert adjusts the values of R, Q, $F_H$, and $F_L$, in step 104, and all weight vectors are re-normalized to a standard length in step 106 before the learning process continues at step 37, FIG. 4A.

Figure 9:
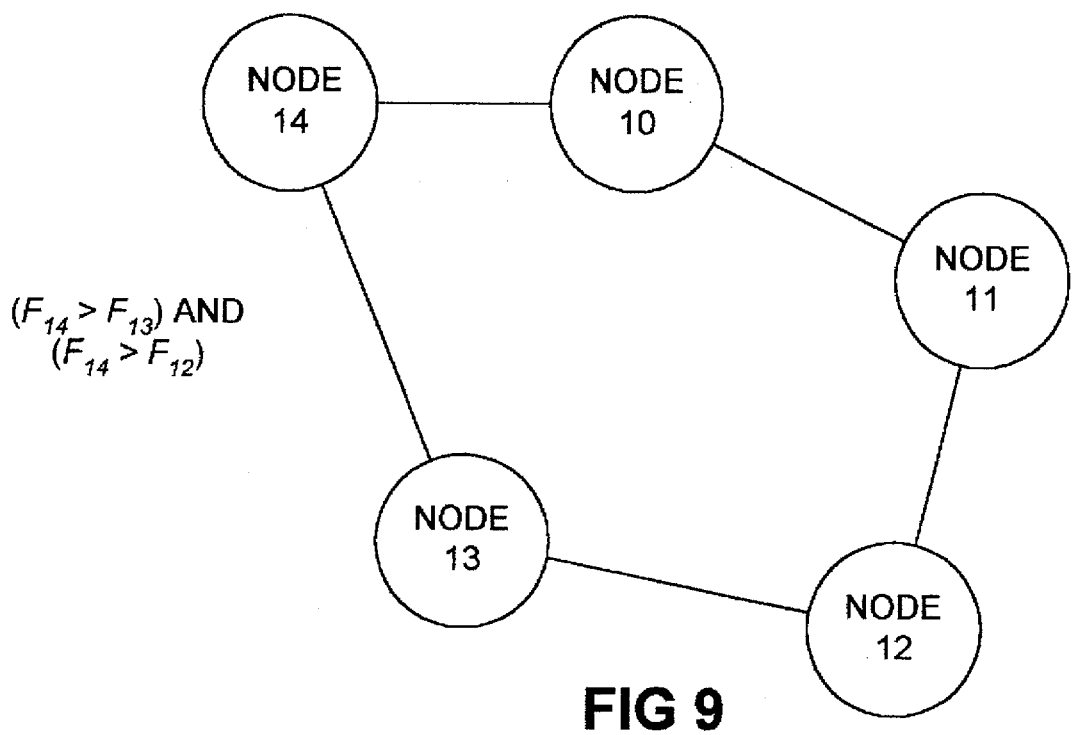
FIG. 9 shows a one-dimensional ring of nodes just before one node is adjusted responsive to frequency measurements in the DSOM learning process embodying the present invention.
Figure 10:
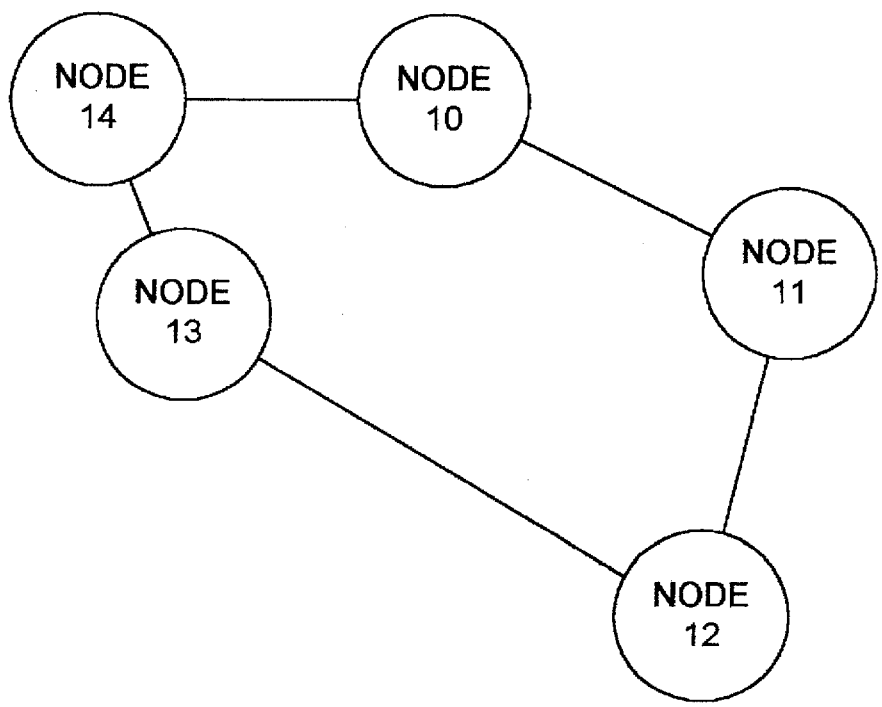
FIG. 10 shows a one-dimensional ring of nodes just after one node has been adjusted responsive to frequency measurements in the DSOM learning process embodying the present invention.

DSOM frequency adjustment of a node is illustrated in FIGS. 9 and 10. FIG. 9 shows a ring of five nodes just before the adjustment of the weights of node 13. As illustrated, node 14 has the larger frequency of the two neighboring nodes, 12 and 14, and also has a frequency greater than that of node 13. Thus the weight vector of node 13 is adjusted to move node 13 along the line of its connection to node 14. The result is shown in FIG. 10.

It is desirable to obtain the maximum possible value of $S_{MIN}$ (worst sample match is at least reasonably represented by some index), the maximum possible value of $S_{TOT}$ (the average sample is well-represented by an index), and an F distribution with the frequency of all nodes being as close as possible to the average frequency, 1/N. The human expert controls the strength of basic SOM learning via parameter R, the strength of large frequency adjustments via the frequency thresholds, and the strength of fine frequency adjustments via parameter Q. Because basic SOM learning distorts the frequency distribution, working against the frequency adjustments, the parameters must be tuned in a repetitive process to get a satisfactory balance of the quality measurements. In general, an expert will reduce R, narrow the difference between $F_H$ and $F_L$ (but no closer than the point where $F_L=F_H/2$), and increase Q on successive adjustments until $S_{MIN}$ and $S_{TOT}$ are no longer increasing and 90% of the node frequencies are within 20-50% of the average frequency.

The adjustment of step 96 in FIG. 4C could be calculated for every adjacent node with a frequency greater than the present node J rather than for node K only. Then the position of the present node J could be adjusted by a vector sum of all of these adjustments. However, it is not clear that this complication would improve performance.

If $F_L=0$ and $F_H=1$, the learning occurs with no LSOM adjustments, but only uses DSOM frequency adjustments. Because there would be no addition or deletion of nodes to change the structure of the network during frequency adjustment, the new process could be applied to output index spaces having greater than one dimension (e.g. a 2-dimensional rectangular grid, a 3-dimensional cubic array, etc.). This raises the possibility of using the new invention to find a SOM having the optimal output dimension for maximum preservation of topological ordering using recently-discovered quantitative measures of topological order. (See H. Bauer and K. Pawelzik, "Quantifying the Neighborhood Preservation of Self-Organizing Feature Maps", *IEEE Transactions on Neural Networks*, Vol. 3, No. 4, July 1992, pp. 570–579)

Recall Phase

The process of the recall phase is much simpler. It is shown in the right-hand column of FIG. 1 as follows:

1. Generate input vector corresponding to the user query (steps 16 and 18).

2. Compute similarity measure for every node of the processing layer to the input vector (part of step 19).

3. Select the node T with the maximum similarity output (part of step 19).

4. Select from nodes T+1 and T−1 the node with the larger similarity output (part of step 19). (Let this be called node V.)

5. Compute the index output(which ranges from 0 to N+1):

[EQ 5]
$$O = \frac{1}{2}\left( T\left( \frac{S(W_T,X)}{S(W_T,X)+S(W_V,X)} \right) + V\left( \frac{S(W_V,X)}{S(W_T,X)+S(W_V,X)} \right) \right)$$

[NOTE: When T=0 and V=N, or T=N and V=0, the 0 value is replaced by N+1 to correct for discontinuity where the ring wraps back on itself.]

The user can get more than one index by specifying that the recall process find all indices associated with similarity output that is greater than some specified fraction of the maximum similarity output. In this case, steps 3, 4, and 5 above will be repeated for the second highest similarity output, the third highest similarity output, and so on, until the next similarity output is below the specified fraction of maximum.

These indices are used to retrieve (step 20, FIG. 1) clusters, or sets, of similar entries from the database that are most closely related to the user query.

PATTERN CLASSIFICATION

A SOM of the present invention may be used effectively to index feature vectors of visual images and sounds, as well as textual data, or any other entities that must be compared to a large number of patterns. Examples of potential uses are the classification of faces, fingerprints, speech, retinal patterns, iris patterns, text articles, large image collections, Oriental characters, objects by color, DNA patterns, biological cells and organisms, and the like.

As an example, consider a training set such as a database of fingerprints which are converted to vectors of wavelet coefficients then input to train the SOM, during which training the one-dimensional index is created. Then, an unknown fingerprint is entered as an input vector and the system responds with a best match and/or nearest best matches. Preservation of topological ordering of the input vectors in the output space, means that next closest matched fingerprints will be located nearby on the output index.

INFORMATION RETRIEVAL

As another example, the use of the SOM for information retrieval is likely to provide two major benefits: (1) faster and cheaper information retrieval for very large databases; (2) easier access for a large number of inexpert users. In one experiment, a version of the embodiment described above is used for text retrieval from a database of bibliographic references in the fields of electronics, physics and computer science. The components of the input vectors (dimension approximately equal to 2000) represent the presence or absence of key topical words in the corresponding references. (In general, vectors may also be derived from statistical measures of word occurrences in corresponding text articles.) All of the references are indexed by a SOM with one-dimensional output.

The SOM maps the vectors into an index space. The fully trained SOM responds to keywords provided by the user representing his interests by generating one or several indices referencing the full textual database. These indices point to regions of the database containing all of the text articles having similar semantic content to the user's query. Thus relevant references are found without scanning the entire database for exact keyword matches, as is a standard method of text retrieval.

In typical text retrieval systems, databases are indexed in a way that depends on the semantic content of the information in each particular database. When the semantic content covers many domains of knowledge, as in on-line bibliographic retrieval, there is often little attempt to index or organize the database. The appropriate knowledge is retrieved by scanning all of the records in the entire database for matches to words given by the user to indicate his interests. Exhaustive searching is slow and costly in computer power. Furthermore, the user must know the specific vocabulary of the target information in order to retrieve it, which limits access to knowledgeable individuals.

The application of a SOM neural network algorithm addresses both difficulties. The SOM can be used to organize a database with arbitrary multi-domain knowledge content into an index that closely matches physical addressing of computer storage, which speeds access and lowers costs. Furthermore, data indexed by a SOM is accessible by a user using search words that approximately match the meaning of words used in the target information. The retrieved information is presented in a manner that is organized according to similarity of semantic meaning, making it easier for the user to adjust his queries as he browses through the database.

What is claimed is:

1. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, a method for improving the ordering of said plurality of multi-dimensional input vectors, said method comprising:

determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes;

deleting a node if said determined frequency for such node is below a predetermined value, thereby defining a deleted node; and connecting the node preceding said deleted node to the node following said deleted node along a line corresponding to said topological ordering of said plurality of input patterns to substantially maintain the topologic, further comprising:

splitting a given node into two nodes if said determined frequency of said given node is above a predetermined value, wherein said step of splitting said given node into two nodes if said determined frequency of said given node is above said predetermined value, comprises:

placing a first node along a first connecting line from said given node to a preceding adjacent node, said first connecting line corresponding to said topological ordering of said plurality of input patterns; placing a second node along a second connecting line from said given node to a following adjacent node, said second connecting line corresponding to said topological ordering of said plurality of input patterns; and deleting said given node.

2. A method in accordance with claim 1, wherein said step of splitting said given node into two nodes if said determined frequency of said given node is above said predetermined value, further comprises:

placing said first node at a position along said first connecting line from said given node to said preceeding adjacent node, said position of said first node being one third way along said first connecting line from said given node to preceeding adjacent node; and placing said second node at a position along said second connecting line from said given node to said following adjacent node, said position of said second node being one third way along said second connecting line from said given node to said following adjacent node.

3. A method in accordance with claim 1, wherein said step of splitting said given node into two nodes if said determined frequency of said given node is above said predetermined value, further comprises:

placing said first node at a position along said first connecting line from said given node to said preceeding adjacent node, the distance from said position of said first node to the position of said given node being a monotonically increasing function of the ratio of said determined frequency of said preceding adjacent node to the said determined frequency of said given node, along said first connecting line between said given node and said preceeding adjacent node; and placing said second node at a position along said second connecting line from said given node to said following adjacent node, the distance from said position of said second node to the position of said given node being a monotonically increasing function of the ratio of said determined frequency of said following adjacent node to the said determined frequency of said given node, along said second connecting line between said given node and said following adjacent node.

4. A method in accordance with claim 1, wherein said step of splitting said given node into two nodes if said determined frequency of said given node is above said predetermined value, further comprises:

placing said first node at a position along said first connecting line from said given node to said preceeding adjacent node, the distance from said position of said first node to the position of said given node being a monotonically increasing function of the result of said determined frequency of said preceding adjacent node minus the said determined frequency of said given node, along said first connecting line between said given node and said preceeding adjacent node; and placing said second node at a position along said second connecting line from said given node to said following adjacent node, the distance from said position of said second node to the position of said given node being a monotonically increasing function of the result of said determined frequency of said following adjacent node minus the said determined frequency of said given node, along said second connecting line between said given node and said following adjacent node.

5. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, a method for improving the ordering of said plurality of multi-dimensional input vectors, said method comprising:

determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes;

splitting a given node into two nodes if said determined frequency of said given node is above a predetermined value, wherein said step of splitting said given node into two nodes if said determined frequency of said given node is above said predetermined value, comprises:

placing a first node along a first connecting line from said given node to a preceding adjacent node, said first connecting line corresponding to said topological ordering of said plurality of input patterns;

placing a second node along a second connecting line from said given node to a following adjacent node, said second connecting line corresponding to said topological ordering of said plurality of input patterns; and deleting said given node.

6. A method in accordance with claim 5, wherein said step of splitting said given node into two nodes if said determined frequency of said given node is above said predetermined value, further comprises:

placing said first node at a position along said first connecting line from said given node to said preceeding adjacent node, said position of said first node being one third way along said first connecting line from said given node to preceeding adjacent node; and placing said second node at a position along said second connecting line from said given node to said following adjacent node, said position of said second node being one third way along said second connecting line from said given node to said following adjacent node.

7. A method in accordance with claim 5, wherein said step of splitting said given node into two nodes if said determined frequency of said given node is above said predetermined value, further comprises:

placing said first node at a position along said first connecting line from said given node to said preceeding adjacent node, the distance from said position of said first node to the position of said given node being a monotonically increasing function of the ratio of said determined frequency of said preceding adjacent node to the said determined frequency of said given node, along said first connecting line between said given node and said preceeding adjacent node; and placing said second node at a position along said second connecting line from said given node to said following adjacent node, the distance from said position of said second node to the position of said given node being a monotonically increasing function of the ratio of said determined frequency of said following adjacent node to the said determined frequency of said given node, along said second connecting line between said given node and said following adjacent node.

8. A method in accordance with claim 5, wherein said step of splitting said given node into two nodes if said determined frequency of said given node is above said predetermined value, further comprises:

placing said first node at a position along said first connecting line from said given node to said preceeding adjacent node, the distance from said position of said first node to the position of said given node being a monotonically increasing function of the result of said determined frequency of said preceding adjacent node minus the said determined frequency of said given node, along said first connecting line between said given node and said preceeding adjacent node; and placing said second node at a position along said second connecting line from said given node to said following adjacent node, the distance from said position of said second node to the position of said given node being a monotonically increasing function of the result of said determined frequency of said following adjacent node minus the said determined frequency of said given node, along said second connecting line between said given node and said following adjacent node.

9. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, a method for improving the ordering of said plurality of multi-dimensional input vectors, said method comprising:

determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes; and comparing the determined frequency of a given node to the determined frequency of an adjacent node; and changing the position of said given node to form a moved node based on said determined frequency of said given node and said determined frequency of said adjacent node.

10. A method in accordance with claim 9, wherein said step of changing the position of said given node to form said moved node further comprises:

changing the position of said given node to form said moved node if the frequency of said adjacent node is greater than the frequency of said given node.

11. A method in accordance with claim 10, wherein said step of changing the position of said given node to form said moved node further comprises:

moving said given node towards said adjacent node along a connecting line from said given node to said adjacent node, said connecting line corresponding to said topological ordering of said plurality of input patterns.

12. A method in accordance with claim 10, wherein said step of changing the position of said given node to form said moved node further comprises:

moving said given node to a position along said connecting line from said given node to said adjacent node, the distance from said position of said moved node to the original position of said given node being a monotonically increasing function of the ratio of said determined frequency of said adjacent node to the said determined frequency of said given node, along said connecting line between said given node and said adjacent node.

13. A method in accordance with claim 10, wherein said step of changing the position of said given node to form said moved node further comprises:

moving said given node to a position along said connecting line from, said given node to said adjacent node, the distance from said position of said moved node to the original position of said given node being a monotonically increasing function of the result of said determined frequency of said adjacent node minus the said determined frequency of said given node.

14. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, an apparatus for improving the ordering of said plurality of multi-dimensional input vectors, said apparatus comprising:

means for determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes;

means for deleting a node if said determined frequency for such node is below a predetermined value, thereby defining a deleted node;

means for connecting the node preceding said deleted node to the node following said deleted node along a line corresponding to said topological ordering of said plurality of input of input patterns to substantially maintain the topological ordering of said ordered array; and means for splitting a given node into two nodes if said determined frequency of said given node is above a predetermined value, wherein said means for splitting said given node into two nodes if said determined frequency of said given node is above said predetermined value, comprises:

means for placing a first node along a first connecting line from said given node to a preceding adjacent node, said first connecting line corresponding to said topological ordering of said plurality of input patterns;

means for placing a second node along a second connecting line from said given node to a following adjacent node, said second connecting line corresponding to said topological ordering of said plurality of input patterns; and means for deleting said given node.

15. An apparatus in accordance with claim 14, wherein said means for splitting said given node into two nodes if said determined frequency of said given node is above said predetermined value, further comprises:

means for placing said first node at a position along said first connecting line from said given node to said preceding adjacent node, said position of said first node being one third way along said first connecting line from said given node to preceding adjacent node; and means for placing said second node at a position along said second connecting line from said given node to said following adjacent node, said position of said second node being one third way along said second connecting line from said given node to said following adjacent node.

16. An apparatus in accordance with claim 14, wherein said means for splitting said given node into two nodes if said determined frequency of said given node is above said predetermined value, further comprises:

means for placing said first node at a position along said first connecting line from said given node to said preceding adjacent node, the distance from said position of said first node to the position of said given node being a monotonically increasing function of the ratio of said determined frequency of said preceding adjacent node to the said determined frequency of said given node, along said first connecting line between said given node and said preceding adjacent node; and means for placing said second node at a position along said second connecting line from said given node to said following adjacent node, the distance from said position of said second node to the position of said given node being a monotonically increasing function of the ratio of said determined frequency of said following adjacent node to the said determined frequency of said given node, along said second connecting line between said given node and said following adjacent node.

17. An apparatus in accordance with claim 14, wherein said means for splitting said given node into two nodes if said determined frequency of said given node is above said predetermined value, further comprises:

means for placing said first node at a position along said first connecting line from said given node to said preceding adjacent node, the distance from said position of said first node to the position of said given node being a monotonically increasing function of the result of said determined frequency of said preceding adjacent node minus the said determined frequency of said given node, along said first connecting line between said given node and said preceding adjacent node; and means for placing said second node at a position along said second connecting line from said given node to said following adjacent node, the distance from said position of said second node to the position of said given node being a monotonically increasing function of the result of said determined frequency of said following adjacent node minus the said determined frequency of said given node, along said second connecting line between said given node and said following adjacent node.

18. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, an apparatus for improving the ordering of said plurality of multi-dimensional input vectors, said apparatus comprising:

means for determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes;

means for splitting a given node into two nodes if said determined frequency of said given node is above a predetermined value, wherein said means for splitting said given node into two nodes if said determined frequency of said given node is above said predetermined value, comprises:

means for placing a first node along a first connecting line from said given node to a preceding adjacent node, said first connecting line corresponding to said topological ordering of said plurality of input patterns;

means for placing a second node along a second connecting line from said given node to a following adjacent node, said second connecting line corresponding to said topological ordering of said plurality of input patterns; and means for deleting said given node.

19. An apparatus in accordance with claim 18, wherein said means for splitting said given node into two nodes if said determined frequency of said given node is above said predetermined value, further comprises:

means for placing said first node at a position along said first connecting line from said given node to said preceding adjacent node, said position of said first node being one third way along said first connecting line from said given node to preceding adjacent node; and means for placing said second node at a position along said second connecting line from said given node to said following adjacent node, said position of said second node being one third way along said second connecting line from said given node to said following adjacent node.

20. An apparatus in accordance with claim 18, wherein said means for splitting said given node into two nodes if said determined frequency of said given node is above said predetermined value, further comprises:

means for placing said first node at a position along said first connecting line from said given node to said preceding adjacent node, the distance from said position of said first node to the position of said given node being a monotonically increasing function of the ratio of said determined frequency of said preceding adjacent node to the said determined frequency of said given node, along said first connecting line between said given node and said preceding adjacent node; and means for placing said second node at a position along said second connecting line from said given node to said following adjacent node, the distance from said position of said second node to the position of said given node being a monotonically increasing function of the ratio of said determined frequency of said following adjacent node to the said determined frequency of said given node, along said second connecting line between said given node and said following adjacent node.

21. An apparatus in accordance with claim 18, wherein said means for splitting said given node into two nodes if said determined frequency of said given node is above said predetermined value, further comprises:

means for placing said first node at a position along said first connecting line from said given node to said preceding adjacent node, the distance from said position of said first node to the position of said given node being a monotonically increasing function of the result of said determined frequency of said preceding adjacent node minus the said determined frequency of said given node, along said first connecting line between said given node and said preceding adjacent node; and means for placing said second node at a position along said second connecting line from said given node to said following adjacent node, the distance from said position of said second node to the position of said given node being a monotonically increasing function of the result of said determined frequency of said following adjacent node minus the said determined frequency of said given node, along said second connecting line between said given node and said following adjacent node.

22. In a neural network for the classification of a plurality of patterns, wherein each of said plurality of patterns is represented by a respective multi-dimensional vector in a multi-dimensional space to form a training set of multi-dimensional input vectors corresponding to said plurality of input patterns, said neural network having a plurality of nodes in an ordered array corresponding to a topological ordering of said plurality of input patterns, an apparatus for improving the ordering of said plurality of multi-dimensional input vectors, said apparatus comprising:

means for determining the frequency that each node in said multi-dimensional space has been previously determined as the closest node to some portion of said plurality of input vectors forming said training set of multi-dimensional input vectors corresponding to said plurality of input patterns, to form a determined frequency for each of said plurality of nodes;

means for comparing the determined frequency of a given node to the determined frequency of an adjacent node; and means for changing the position of said given node to form a moved node based on said determined frequency of said given node and said determined frequency of said adjacent node.

23. An apparatus in accordance with claim 22, wherein said means for changing the position of said given node to form said moved node further comprises:

means for changing the position of said given node to form said moved node if the frequency of said adjacent node is greater than the frequency of said given node.

24. An apparatus in accordance with claim 23, wherein said means for changing the position of said given node to form said moved node further comprises:

means for moving said given node towards said adjacent node along a connecting line from said given node to said adjacent node, said connecting line corresponding to said topological ordering of said plurality of input patterns.

25. An apparatus in accordance with claim 23, wherein said means for changing the position of said given node to form said moved node further comprises:

means for moving said given node to a position along said connecting line from said given node to said adjacent node, the distance from said position of said moved node to the original position of said given node being a monotonically increasing function of the ratio of said determined frequency of said adjacent node to the said determined frequency of said given node, along said connecting line between said given node and said adjacent node.

26. An apparatus in accordance with claim 23, wherein said means for changing the position of said given node to form said moved node further comprises:

means for moving said given node to a position along said connecting line from said given node to said adjacent node, the distance from said position of said moved node to the original position of said given node being a monotonically increasing function of the result of said determined frequency of said adjacent node minus the said determined frequency of said given node.

* * * * *